April 25, 1944.  D. S. KENNEDY  2,347,415
NONSKID DEVICE
Filed Oct. 1, 1942  2 Sheets-Sheet 1
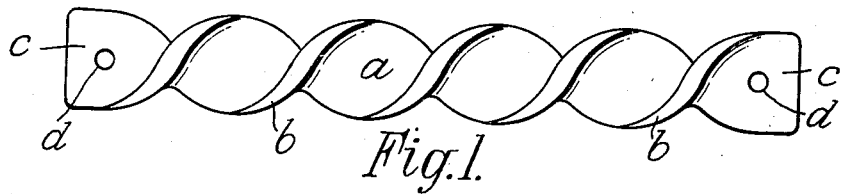
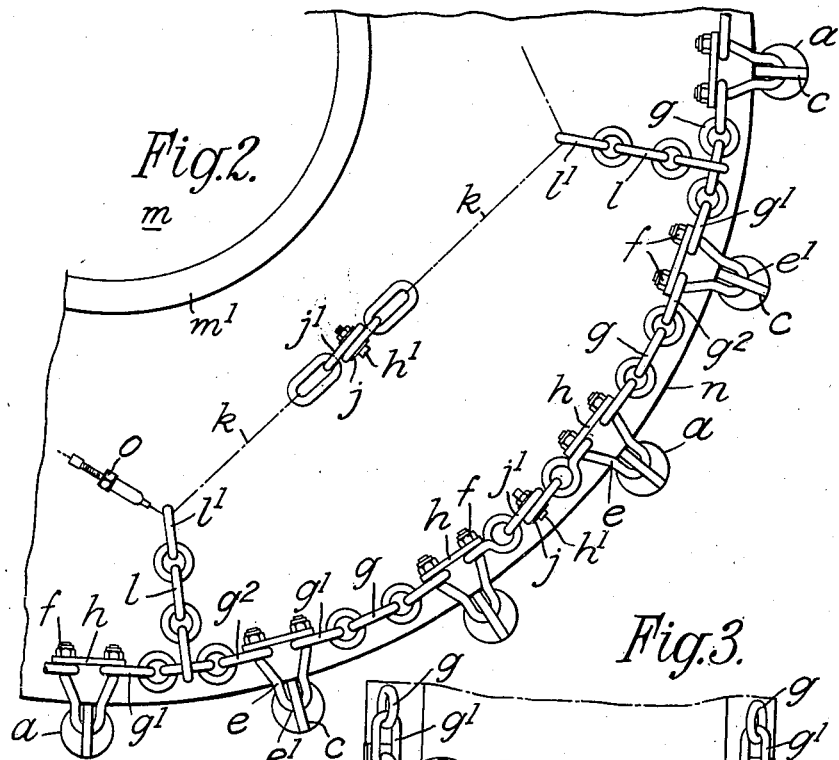
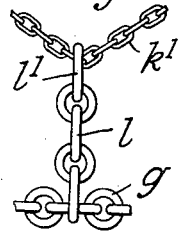
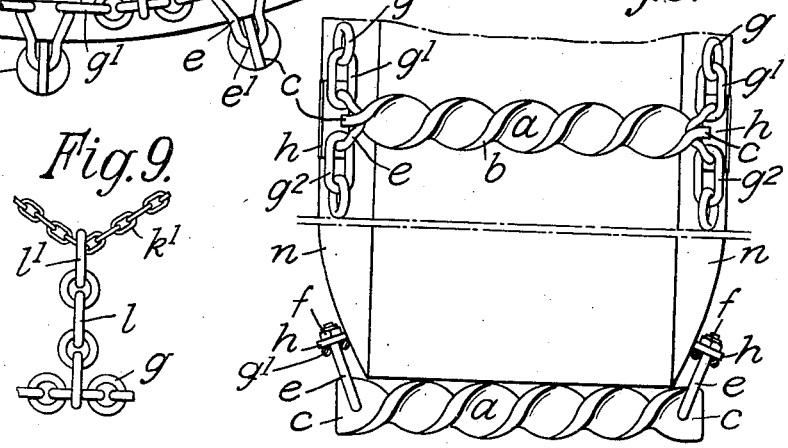
Inventor
DONALD STUART KENNEDY
By
atty.

April 25, 1944.  D. S. KENNEDY  2,347,415
NONSKID DEVICE
Filed Oct. 1, 1942  2 Sheets-Sheet 2
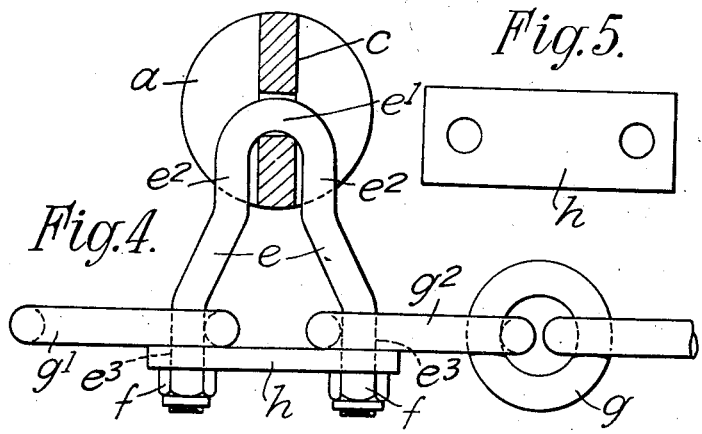
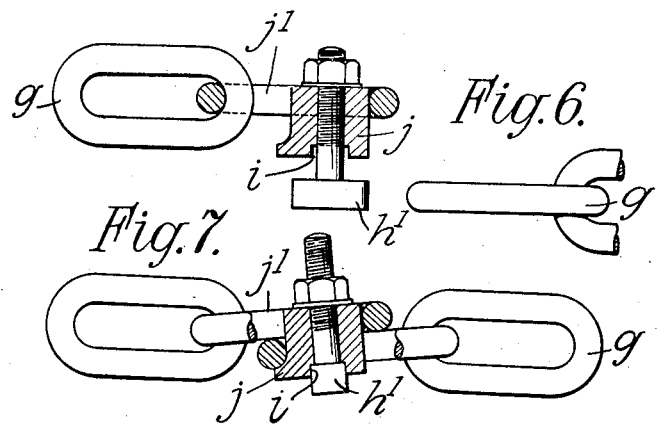
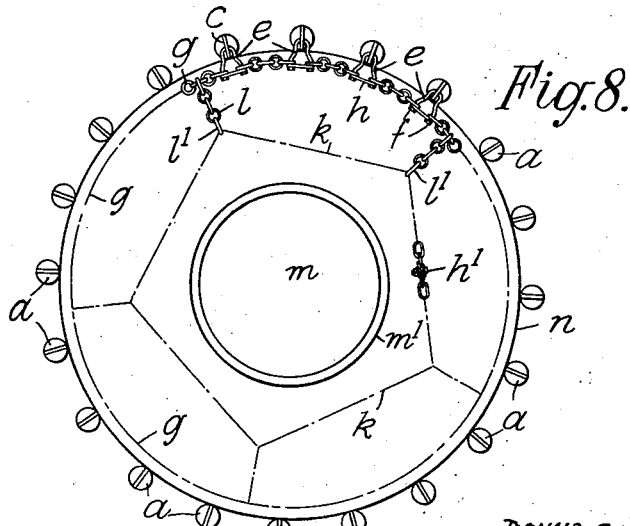

Patented Apr. 25, 1944

2,347,415

UNITED STATES PATENT OFFICE 2,347,415

NONSKID DEVICE

Donald Stuart Kennedy, Longparish, Andover, England

Application October 1, 1942, Serial No. 460,439
In Great Britain October 10, 1941

7 Claims. (Cl. 152—226)

This invention has reference to non-skid chains for the pneumatic tires of vehicle wheels. It is particularly applicable to disk wheels of the kind comprising a rim of small diameter with a pneumatic tire of comparatively large cross-sectional area having poor lateral clearance from adjacent parts of the vehicle.

The present invention has for an object to provide the wheel with a non-skid chain including shoes made from twisted metal bars of ribbon shape. Another object is to provide means for retaining said twisted bars in the desired position upon the tire of the wheel. A further object is to secure said shoes upon lateral retaining chains and to tension said retaining chains from a zone between the said chains and the axis of the wheel. Additional objects are to provide shackle members which engage extremital flat lugs or tab-pieces upon the twisted metal bars and hold said flat lugs radial of the wheel.

The invention is hereafter described with reference to the annexed drawings, in which—

Fig. 1 is an elevation of one of the twisted elements fitted with extremital lugs or tab-pieces. Fig. 2 is a side elevation of part of a disk wheel having a large size pneumatic tire and fitted with an overall chain or girdle constructed according to this invention. Fig. 3 is an elevation of part of Fig. 2, at right angles thereto, these two views being on a smaller scale. Fig. 4 is a front elevation on a larger scale, of one of the shackles connecting the twisted element with the lateral retaining chain. Fig. 5 is a plan of a washer plate seen in Fig. 4. Figs. 6 and 7 are elevations, part section, of a suitable coupling device for the retaining chain. Fig. 8 is a side view of the wheel, showing the flexible tensioning member arranged as a pentagon. Fig. 9 is a view of a linkage between a retaining chain and a tensioning member in the form of a flexible chain.

The twisted element $a$ (Fig. 1) is made from a rigid bar of metal of ribbon shape having convolutions $b$ and flat extremital lugs or tab-pieces $c$. The two tab-pieces are in alignment with one another, with the axis of the twisted element $a$, and with the wheel radius intersecting said axis, as seen in Fig. 2. They are cross bored or perforated at $d$ and said cross-bores are engaged by the rounded or closed bends $e^1$ of U-shaped or V-shaped shackles $e$, as best shown in Fig. 4. The shackle engages the tab-piece in such a way that the front and rear faces of the tab-piece are held between and substantially parallel with the parallel portions $e^2$ of the arms of the shackle, on either side of the rounded or closed bend $e^1$ which passes through the bore or perforation $d$ in the tab-piece and holds the rigid twisted element in its operative position upon the tire.

The arms of each shackle $e$ comprise outwardly divergent portions having at each end parallel portions $e^2$ and $e^3$. The parallel portions $e^2$ merge into the rounded or closed bend $e^1$. The parallel portions $e^3$ are screw-threaded and provided with nuts $f$. The portions $e^3$ are directly connected with the lateral retaining chain $g$. As shown, they pass through the end or facing links $g^1g^2$ of a retaining chain $g$ and are maintained therein by a washer plate $h$ and the nuts $f$ which hold said washer plate against the ends of the two facing links $g^1g^2$. This washer plate bridges the gap between the ends $e^3e^3$. It forms a direct connection between the facing end links $g^1g^2$ and prevents the springing apart of the shackle arms. The arrangement is such that the rounded or closed bend $e^1$ engages the perforation $d$ in the flat tab-piece $c$ and the parallel portions $e^2$ and $e^3$ of each shackle are substantially parallel with the front and rear faces of the tab-piece $c$, see Fig. 4, the rigid twisted element $a$ being thus held in operative position with the tab-pieces $cc$ substantially radial of the wheel.

The series of shoes is provided on each side of the wheel with one of these lateral retaining chains $g$ and these chains are each provided with a suitable disconnectible coupling such as illustrated in Figs. 6 and 7. The T-headed bolt $h^1$ of this coupling device can be drawn through the oval link or be turned to become seated in the transverse recess $i$ in the block $j$ carrying the link $j^1$. Block $j$ is integral with the link $j^1$ (see Figs. 6 and 7) and passes through the opposite end link, being secured by bolt $h^1$ acting as a clamping device.

In the example illustrated, the wheel is a disk wheel having a central disk $m$ with rim $m^1$ on which the pneumatic tire $n$ is mounted. This rim $m^1$ may be for instance 24″ diameter and the tire $n$ be of 21″ cross section.

The lateral retaining chains $gg$ for these shoes are tensioned and held in place by spaced-apart linkages engaged at their inner ends by comparatively loose or tensioning flexible members $k$ on each side of the wheel.

The loose flexible members $k$ may be stranded wire cables and they are shown located between the rim $m^1$ and a zone in the middle portion of the tire wall but radially inwards of the retaining chain $g$. They are connected by means of short linkages *l* well spaced apart, to some of the links in the lengths of lateral retaining chains *gg*.

For example, each of the loose or tensioning members *k* may, by means of five short linkages *l* arranged approximately radially of the wheel and as close as possible to the tire walls, be kept in the shape of a pentagon and connected with the lateral retaining chain *gg* at points intermediate of the shoes. The tensioning cable *k* is threaded through the end link $l^1$ of the short linkage *l* so that it can ride or move freely therethrough whilst the opposite end link of such linkage *l* engages one of the lateral retaining chains *g*.

Where the wheel to be fitted with this improved chain or girdle, is an ordinary spoked pneumatic tired wheel, the tensioning members *kk* are likewise located on each side of the wheel between the axis or hub and the rim of the wheel.

Each loose or tensioning member *k* is provided with a suitable coupling device such as $jj^1$ (Figs. 2 and 6) for connecting together the two ends after the latter have been brought together and the lateral retaining chain *g* on that side of the wheel has been correspondingly tensioned. Thus, when both the tensioning members *kk* have been coupled and both the lateral retaining chains *gg* have been tensioned, the shoes are firmly seated upon the wheel tire, as will be understood from Figs. 2 and 3.

Instead of stranded wire cables as indicated in Figs. 2 and 8, I may employ fine mesh chains $k^1$ as shown in Fig. 9, these chains $k^1$ being sufficiently flexible to slide or move freely through the end links $l^1 l^1$ of the linkages *ll*.

The cables *k* or chains $k^1$ may themselves be provided in their length with a turnbuckle device *o* of known character to enable undue slack to be taken up.

This invention overcomes the difficulty of fitting overall chains or girdles where poor clearance exists between the wheel and the chassis of the vehicle, and it is therefore impossible to fit non-skid devices of the kind described in my prior Patent No. 2,095,523, comprising spirally twisted elements attached to the lateral retaining chains by projecting side wings or by prolonged lugs at the ends of the twisted elements. The present invention is more particularly intended for use upon the wheels of certain excavators or mechanical vehicles used for preparing aerodromes where the tire will not always give sufficient grip if the ground surface, even gravel soil, is wet or greasy, and the application of non-skid devices to increase the grip is made difficult by the small amount of clearance provided by the large-section tires usually fitted to such vehicles.

What I claim is:

1. A non-skid chain for wheel tires, comprising rigid twisted elements set transversely of the wheel, said elements having flat extremital tab-pieces, said tab-pieces being aligned radially of the wheel and bored transversely, lateral retaining chains on the sides of the wheel, and shackle members connecting said retaining chains with said tab-pieces, said shackle members extending radially outwards from said retaining chains and each including divergent arms having parallel end portions, and a bend to traverse and engage one of said tab-pieces, said bend having parallel sides adapted to face the front and rear of said tab-piece.

2. A non-skid chain for wheel tires, comprising rigid twisted elements set transversely of the wheel, said elements having flat extremital tab-pieces, said tab-pieces being aligned radially of the wheel and bored transversely, lateral retaining chains on the sides of the wheel, and shackle members connecting said retaining chains with said tab-pieces, said shackle members extending radially outwards from said retaining chains and each including divergent arms having parallel end portions and a bend at the narrower end of said divergent arms to pass through the bore in said tab-piece, and a washer plate secured to the wider end of said shackle and bridging the gap between said ends, said washer plate forming the base of a triangulated shackle-structure having its apex at said bend.

3. A non-skid tire chain, comprising a series of rigid twisted elements set transversely of the wheel, said elements having flat, extremital tab-pieces, said tab-pieces being aligned with one another radially of the wheel and cross-bored, lateral retaining chains on each side of the wheel, means for tensioning said retaining chains from a zone between said retaining chains and the axis of said wheel, and radially disposed shackle members connecting said retaining chains with the tab-pieces of said twisted elements, said shackle members being adapted to rock upon axes substantially radial to the wheel and to hold said aligned tab-pieces radial of the wheel, and said tensioning means being adapted to restrict movement of said shackle members by applying tension to one of said retaining chains.

4. A non-skid tire chain, comprising a series of rigid twisted elements set transversely of the wheel, said elements having flat, extremital tab-pieces, said tab-pieces being aligned with one another radially of the wheel and cross-bored, lateral retaining chains on each side of the wheel, linkages secured at intervals to said retaining chains and extending radially inwards of the wheel, flexible tensioning members passing through said linkages and holding said linkages in their operative position, means for coupling the ends of said tensioning members, and radially disposed shackle members connecting said retaining chains with the tab-pieces of said twisted elements, each said shackle member including a U-shaped bend adapted to engage the bore in one of said tab-pieces and divergent arms having parallel end portions secured to one of said lateral retaining chains, each of said shackle members being adapted to rock upon an axis extending across said parallel end portions in the line of said retaining chain, and said tensioning members being adapted to restrict rocking movement of said shackle members upon their respective axes by applying tension through said linkages to said retaining chains.

5. A non-skid chain for the tire of a disk wheel, comprising a series of rigid twisted elements set transversely of the disk wheel, said elements having flat, extremital tab-pieces, said tab-pieces being aligned with one another radially of the wheel and perforate, lateral retaining chains on each side of the disk wheel, means for tensioning said retaining chains from a zone between said retaining chains and the axis of the disk wheel, radially disposed shackle members connecting said retaining chains with said tab-pieces, said shackle members including U-shaped bends adapted to engage the perforations in said aligned tab-pieces, arms which are divergent intermediately of their length, and parallel extremital portions at the wider-apart ends of said divergent arms, said parallel extremital portions being screw threaded, traversing the links of said retaining chains and secured thereto by nuts on said screw threaded portions, and washer plates bridging the gaps between said arms and traversed by said screw-threaded ends, said washer plates forming the bases of triangulated shackle-structures having their apices at the respective U-shaped bends, said shackles being adapted to rock on said bases to accommodate transverse movement of said elements across the tire tread, and said tensioning means being adapted to restrict rocking movement of said shackles by applying tension to said retaining chains at a limited transverse movement of said elements across the tire tread.

6. In a non-skid tire chain of the character described, the combination with a twisted metal element having aligned flat extremital lugs, said lugs being bored transversely of lateral retaining chains located one on each side of the said tire, of means for tensioning said retaining chains, and of radially disposed shackle members of U-shape with arms having parallel extremities directed radially inwards of the tire, said shackle members having outwardly divergent portions in their length, the bends of said U-shaped shackle member being directed radially outwards of said tire and passing through said bored flat extremital lugs to retain the said twisted element in position across the tire tread and the opposite ends of said arms being rigidly secured to said lateral retaining chains, each of said shackle members being adapted to rock upon an axis extending across said parallel extremities in the line of its retaining chain as its bend pivots in the extremital lug of the twisted element.

7. In a non-skid tire chain, a plurality of twisted metal elements each having extremital tab-pieces, a pair of lateral retaining chains, means for tensioning each of said retaining chains, and radially disposed shackle members connecting said retaining chains with the tab-pieces of said elements to control movement of said elements transversely across the tire to which said tire chain is fitted, each of said shackle members comprising a U-bend, a pair of divergent arms from said U-bend, parallel extremital portions at the wider-apart ends of said arms, and a washer plate connecting the wider-apart ends of said arms, said U-bend providing a pivotal connection with an aperture in the respective tab-piece, and said wider-apart ends and washer plate forming the base of a triangle having its apex at said U-bend, said base being in line with the retaining chain connected to said shackle member.

DONALD STUART KENNEDY,